United States Patent
Levi et al.

(10) Patent No.: US 10,574,546 B2
(45) Date of Patent: Feb. 25, 2020

(54) NETWORK MONITORING USING SELECTIVE MIRRORING

(71) Applicant: Mellanox Technologies TLV Ltd., Raanana (IL)

(72) Inventors: Lion Levi, Yavne (IL); Gil Levy, Hod Hasharon (IL); Zachy Haramaty, Hemed (IL)

(73) Assignee: Mellanox Technologies TLV Ltd., Raanana (IL)

( * ) Notice: Subject to any disclaimer, the term of this patent is extended or adjusted under 35 U.S.C. 154(b) by 139 days.

(21) Appl. No.: 15/276,823

(22) Filed: Sep. 27, 2016

(65) Prior Publication Data
US 2018/0091387 A1   Mar. 29, 2018

(51) Int. Cl.
  *H04L 12/26* (2006.01)
  *H04L 29/08* (2006.01)
  *H04L 12/24* (2006.01)
  *H04L 12/58* (2006.01)

(52) U.S. Cl.
  CPC ........ *H04L 43/028* (2013.01); *H04L 41/0823* (2013.01); *H04L 43/026* (2013.01); *H04L 67/1095* (2013.01); *H04L 41/0886* (2013.01); *H04L 41/5009* (2013.01); *H04L 43/00* (2013.01); *H04L 43/12* (2013.01); *H04L 51/00* (2013.01)

(58) Field of Classification Search
  None
  See application file for complete search history.

(56) References Cited

U.S. PATENT DOCUMENTS

| | | | |
|---|---|---|---|
| 7,031,304 B1 * | 4/2006 | Arberg | H04L 43/028 370/360 |
| 7,292,573 B2 | 11/2007 | Lavigne et al. | |
| 8,204,958 B2 | 6/2012 | Oliynyk et al. | |
| 8,787,176 B2 | 7/2014 | Ford et al. | |
| 8,819,213 B2 * | 8/2014 | Frattura | H04L 12/2602 709/223 |
| 9,369,366 B2 | 6/2016 | Richards et al. | |
| 9,529,621 B2 | 12/2016 | Richards et al. | |
| 9,584,393 B2 | 2/2017 | Kjendal et al. | |
| 9,716,661 B2 | 7/2017 | Aybay | |
| 9,955,023 B2 | 4/2018 | Richards et al. | |
| 10,212,224 B2 | 2/2019 | Kjendal et al. | |
| 2001/0055274 A1 * | 12/2001 | Hegge | H04L 43/026 370/229 |

(Continued)

OTHER PUBLICATIONS

U.S. Appl. No. 15/390,560 office action dated Mar. 21, 2019.

*Primary Examiner* — James A Edwards
(74) *Attorney, Agent, or Firm* — Kligler & Associates Patent Attorneys Ltd (57) ABSTRACT

A network element includes multiple interfaces and circuitry. The interfaces are configured to connect to a communication system. The circuitry is configured to monitor a respective buffering parameter of data flows received via an ingress interface and queued while awaiting transmission via respective egress interfaces, to identify, based on the respective buffering parameter, at least one data flow for mirroring, to select one or more packets of the identified data flow for analysis by a network manager, and to send the selected packets to the network manager over the communication system via an egress interface.

22 Claims, 3 Drawing Sheets

(56) References Cited

U.S. PATENT DOCUMENTS

| | | | |
|---|---|---|---|
| 2002/0161914 A1* | 10/2002 | Belenki | H04L 47/10 |
| | | | 709/235 |
| 2005/0141423 A1 | 6/2005 | Lee et al. | |
| 2006/0143300 A1 | 6/2006 | See et al. | |
| 2007/0056028 A1 | 3/2007 | Kay | |
| 2007/0058632 A1 | 3/2007 | Back et al. | |
| 2011/0191414 A1* | 8/2011 | Ma | H04L 65/608 |
| | | | 709/203 |
| 2012/0233349 A1 | 9/2012 | Aybay | |
| 2013/0088969 A1* | 4/2013 | Mukherjee | H04L 43/0882 |
| | | | 370/236 |
| 2014/0098822 A1 | 4/2014 | Galles et al. | |
| 2014/0136723 A1 | 5/2014 | Branson et al. | |
| 2014/0192646 A1 | 7/2014 | Mir et al. | |
| 2014/0280829 A1* | 9/2014 | Kjendal | H04L 43/028 |
| | | | 709/223 |
| 2014/0280889 A1 | 9/2014 | Nispel et al. | |
| 2015/0089045 A1 | 3/2015 | Agarwal et al. | |
| 2015/0113132 A1 | 4/2015 | Srinivas et al. | |
| 2015/0271081 A1 | 9/2015 | Arumilli et al. | |
| 2016/0050150 A1 | 2/2016 | Venkatesan | |
| 2016/0134563 A1* | 5/2016 | Yu | H04L 12/4625 |
| | | | 370/390 |
| 2016/0301632 A1* | 10/2016 | Anand | H04L 47/125 |
| 2018/0183724 A1 | 6/2018 | Callard et al. | |

\* cited by examiner

NETWORK MONITORING USING SELECTIVE MIRRORING

TECHNICAL FIELD

Embodiments described herein relate generally to communication networks, and particularly to methods and systems for network monitoring using selective mirroring.

BACKGROUND

Communication networks may be monitored for various purposes such as network management, security, collection of statistical information on the network behavior and debugging. The network can be monitored using various techniques. For example, in port mirroring, packets seen on a switch or a router port are copied and typically sent to a central network management appliance.

Methods for network monitoring using mirroring are known in the art. For example, U.S. Patent Application Publication 2014/0280829, whose disclosure is incorporated herein by reference, describes a function that is provided in a network system for the dynamic mirroring of network traffic for a variety of purposes including the identification of characteristics of the traffic. Multiple criteria are established for when, what and where to mirror the traffic. The criteria include what frames of traffic to mirror, what portions of the selected frames to mirror, one or more portals through which to mirror the selected frames, a destination for the mirroring and the establishment of a mirror in a device to carry out the mirroring. The criteria may also include when to stop the mirroring. The mirroring instructions can be changed based on the detection of a triggering event, such as authentication, device type or status, ownership of an attached function attached to the device, flow status, but not limited to that. The function may be established in one or more devices of the network.

U.S. Pat. No. 8,819,213, whose disclosure is incorporated herein by reference, describes a method and systems for dynamically mirroring network traffic. The mirroring of network traffic may comprise data that may be considered of particular interest. The network traffic may be mirrored by a mirror service portal from a mirror sender, referred to as a mirror source, to a mirror receiver, referred to as a mirror destination, locally or remotely over various network segments, such as private and public networks and the Internet. The network traffic may be mirrored to locations not involved in the network communications being mirrored.

SUMMARY

An embodiment that is described herein provides a network element that includes multiple interfaces and circuitry. The interfaces are configured to connect to a communication system. The circuitry is configured to monitor a respective buffering parameter of data flows received via an ingress interface and queued while awaiting transmission via respective egress interfaces, to identify, based on the respective buffering parameter, at least one data flow for mirroring, to select one or more packets of the identified data flow for analysis by a network manager, and to send the selected packets to the network manager over the communication system via an egress interface.

In some embodiments, the buffering parameter is indicative of levels of quality of service associated with the respective received data flows, and the circuitry is configured to identify a given data flow for mirroring, by predicting, based on the buffering parameter, impending degradation in the level of quality of service associated with the given data flow. In other embodiments, the circuitry is configured to identify a given data flow for mirroring before the circuitry detects a condition that causes the circuitry to discard one or more packets of the given data flow.

In an embodiment, the buffering parameter specifies a level of buffer usage by an interface of the network element, and the circuitry is configured to identify for mirroring the data flows delivered via a given interface when an actual level of buffer usage by the given interface exceeds a predefined usage threshold. In another embodiment, the buffering parameter specifies a queue length value, and the circuitry is configured to identify for mirroring the data flows stored in a given queue, when an actual queue length value of the given queue exceeds a predefined queue length threshold. In yet further another embodiment, the buffering parameter specifies a packet latency value, and the circuitry is configured to derive a result value from multiple packet latencies of respective packets belonging to the at least one data flow, and to identify a given data flow for mirroring when the result value derived from the packets of the given data flow exceeds a predefined latency threshold.

In some embodiments, the buffering parameter specifies a congestion state, and the circuitry is configured to identify a given data flow for mirroring when determining that the given data flow is congested. In other embodiments, the circuitry is configured to select the one or more packets by sampling the packets of the identified data flow at a predefined sampling rate. In yet other embodiments, the circuitry is configured to send the selected packets along with respective mirroring-related metadata.

There is additionally provided, in accordance with an embodiment that is described herein, a method including monitoring, in a network element that includes multiple interfaces configured to connect to a communication system, a respective buffering parameter of data flows received via an ingress interface and queued while awaiting transmission via respective egress interfaces. At least one data flow is identified for mirroring based on the respective buffering parameter. One or more packets of the identified data flow are selected for analysis by a network manager. The selected packets are sent to the network manager over the communication system via an egress interface.

These and other embodiments will be more fully understood from the following detailed description of the embodiments thereof, taken together with the drawings in which:

DETAILED DESCRIPTION OF EMBODIMENTS

Overview

Various communication networks are managed using a central network manager. To maintain optimal performance, the network is typically monitored by several network elements that each reports its local state to the network manager. Based on the reported information, the network manager identifies bottlenecks and other problems in the network behavior, and reports them to a network administrator who re-configures the network to resolve the problems detected, thus enhancing the network performance. The network manager may also adapt at least part of the network configuration automatically.

One approach for monitoring the network is to send, by a network element, e.g., a switch, router or Network Interface Controller (NIC), some of the packets traversing the network element, to the network manager, in addition to their intended destination. Such a duplicate packet delivery is referred to as "mirroring" and a packet sent to the network manager is also referred to as a "mirrored packet".

Typically, the network administrator configures the network elements (e.g., switches or routers) to mirror packets that meet certain criteria. For example, the criterion may specify mirroring packets that are received from the network via a given ingress interface and/or delivered to the network via a given egress interface of the network element. Alternatively or additionally, the mirroring criterion may specify packets that are associated with a given Virtual LAN (VLAN). Further alternatively or additionally, the criterion may require mirroring packets based on certain fields in the packet's headers such as source and destination addresses, source and destination ports, and the underlying protocol used.

A mirroring approach in which the mirroring criterion is insensitive to conditions evolving within the switch due to the actual network traffic (such as the example static criteria described above) typically suffers from several disadvantages:

The scalability of such a solution is poor because the network is typically flooded with large amounts of mirrored packets, which require network resources and interfere with user data delivery.

The network manager is overwhelmed with a large number of mirrored packets of which only a small subset of the packets may be indicative of actual network problems.

To control the bandwidth consumed by the mirrored packets, only a partial subset of the packets that pass the mirroring criterion are sampled and sent to the network manager. As a result, some packets that are valuable for identifying network problems may fail to be mirrored.

Embodiments that are described herein provide improved methods and systems for monitoring the network. In the disclosed embodiments, the packets traversing the network element are associated with respective data flows, and are mirrored selectively based on a buffering parameter of the data flows, as will be described below.

In the context of the present patent application and in the claims, the term "data flow" (also referred to as "flow" for brevity) refers to a sequence of packets, which transfer application data between a pair of end nodes.

In the description that follows we mainly refer to a network switch, but the disclosed embodiments are also applicable to other suitable types of network elements.

In the disclosed embodiments, the switch receives from the network packets belonging to one or more respective data flows via one or more ingress ports. The switch temporarily stores the received packets in respective ingress queues as necessary, routes the packets to respective egress ports in accordance with a predefined routing scheme, and stores the routed packets in respective egress queues.

The switch monitors the buffering parameter of the data flows to identify data flows whose packets should be mirrored. The switch samples packets from the identified data flows, and sends the sampled packets to the network manager over the network via an egress port.

In the disclosed embodiments, the buffering parameter is indicative of levels of quality of service associated with the respective data flows, and the switch identifies a given data flow for mirroring by predicting, based on the buffering parameter, impending degradation in the level of quality of service associated with the given data flow. The level of quality of service can be defined, for example, in terms of a required bit rate, delay, jitter, packet loss or bit error rate.

In some embodiments, the switch identifies a given data flow for mirroring before detecting a condition (e.g., a congestion condition) that causes the switch to discard one or more packets of the given data flow.

Various types of buffering parameters can be used for identifying data flows for mirroring. In some embodiments, the buffering parameter specifies a level of buffer usage by an interface of the network element. The switch identifies for mirroring the data flows delivered via a given interface when the actual level of buffer usage of the given interface exceeds a predefined usage threshold. In other embodiments, the buffering parameter specifies a queue length value, and the switch identifies for mirroring the data flows stored in a given queue, when an actual queue length value of the given queue exceeds a predefined queue length threshold.

In some embodiments, the buffering parameter specifies a packet latency value, and the switch identifies a given data flow for mirroring, when a value of a statistical property (e.g., average) calculated over multiple packet latencies of respective packets belonging to the given data flow exceeds a predefined latency threshold. In another embodiment, the buffering parameter specifies a congestion state, and the switch identifies a given data flow for mirroring when determining that the given data flow becomes congested.

In some embodiments, in addition to the mirrored packets, the switch sends to the network manager respective metadata that assists the network manager in identifying and resolving network problems.

In the disclosed techniques, the switch identifies a given data flow for mirroring when detecting a condition that predicts imminent degradation in the quality of service of the given data flow. By using the disclosed techniques, most of the packets sent to the network manager are related to actual network problems, and therefore the amount of network resources required for mirroring is reduced, and the network scalability is improved. Moreover, since the network manager receives packets and related metadata that focus on network problems as they occur, the network manager is able to identify the root elements causing these problems and relevant top contributors.

System Description

Figure 1:
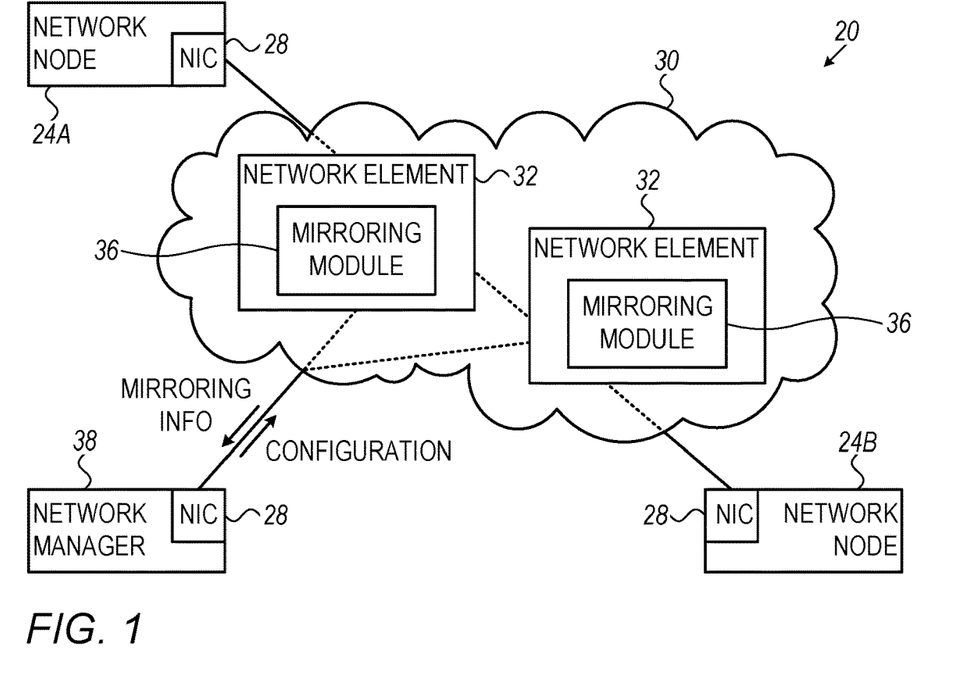
FIG. 1 is a block diagram that schematically illustrates a computer system, in accordance with an embodiment that is described herein.

FIG. 1 is block diagram that schematically illustrates a computer system 20, in accordance with an embodiment that is described herein. System 20 comprises multiple host computers 24 which communicate with one another over a network 30 and thus function as network nodes of the network. Network nodes 24 connect to network via respective Network Interface Controllers (NICs) 28. Although in the example of FIG. 1, the computer system comprises two network nodes 24A and 24B, a practical computer system may comprise any suitable number of network nodes.

Network 30 may comprise any suitable communication network such as, for example, an InfiniBand (IB) switch fabric, or packet networks of other sorts, such as Ethernet or Internet Protocol (IP) networks, that are configured for transport-layer transaction support. Alternatively, network 30 may operate in accordance with any other suitable standard or protocol.

Network 30 typically comprises multiple network elements 32, which are interconnected. Network elements 32 may comprise, for example, switches, routers, bridges, gateways, or any other suitable type of network elements.

Network 30 is managed using a central network manager 38 that connects to the network via a NIC. The network manager enables a network administrator to setup the network and provision the network elements. Network manager 38 additionally receives from the network elements information to be used for fault analysis, and for detecting various problems such as bottlenecks and congestion conditions across the network. Network manager analyses the received information to provide the network administrator with visibility to the network performance. The administrator can then optimize the network performance by re-configuring the network elements accordingly. Alternatively or additionally, the network manager applies at least part of the elements re-configuration automatically. Based on the mirrored information, the network manager can also configure new mirroring rules that focus on the suspicious data flows.

In computer system 20, the network manager monitors network 30 using mirroring techniques, in which the network elements sends selected packets to the network manager for analysis. Network element 32 comprises a mirroring module 36, which selectively mirrors packets for analysis by the network manager based on various criteria, as will be described in detail below. In some embodiments the network element sends to the network manager, along with the mirrored packets, metadata information that further assists the network manager in determining the root reasons that cause the suboptimal performance and the top users contributing to the degraded performance.

Although in computer system 20 of FIG. 1 the network manager is implemented on a dedicated network node, in alternative embodiments, the network manager can be implemented within one of network nodes 24, and executed by a processor of the network node.

Embodiments Implementing Selective Mirroring

Figure 2:
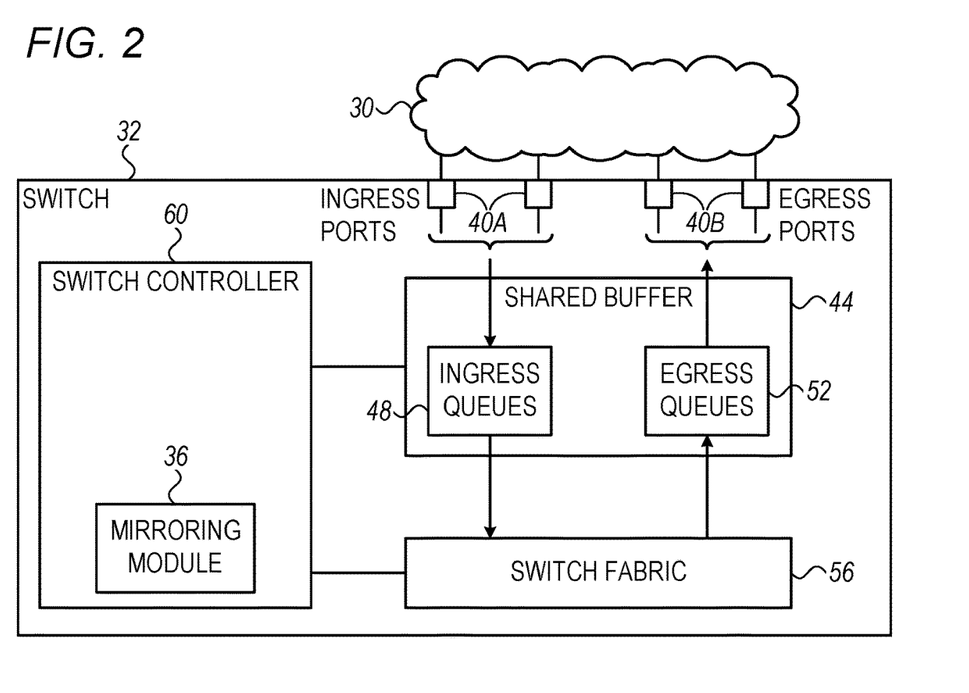
FIG. 2 is a block diagram that schematically illustrates a network element that applies selective mirroring, in accordance with an embodiment that is described herein.

FIG. 2 is a block diagram that schematically illustrates a network switch 32 that applies selective mirroring, in accordance with an embodiment that is described herein. Although the description that follows refers mainly to a network switch, the disclosed techniques can be used with various other types of network elements.

Switch 32 comprises multiple ports 40 for exchanging data packets with network 30. In some embodiments, a given port 40 can function as an ingress interface for incoming packets or as an egress interface for outputting packets. Alternatively, a port 40 can function as both ingress and egress interfaces. In the present example, ports 40A are configured as ingress interfaces, whereas ports 40B are configured as egress interfaces.

Switch 32 comprises a shared buffer 44 that manages various aspects of allocating buffering resources. As such, the shared buffer supports counting packets or bytes at the port and priority levels or at a queue level. The shared buffer also supports aggregating counts of the same or different types. In the present example, shared buffer 44 comprises one or more ingress queues 48 for storing packets arriving from the network via the ingress interfaces, and one or more egress queues 52 for storing packets awaiting transmission to the network via the egress interfaces. In shared buffer 44, queues of different sizes may be dynamically allocated to different data flows or to different ingress or egress interfaces. Using a shared buffer is advantageous over using a conventional buffer with static queue allocation, for example, in handling and absorbing flow microbursts, as described herein. A flow microburst is a condition in which a large number of flows are simultaneously destined for transmission via a common egress interface of the switch.

Note that using a shared buffer for queuing the packets is not mandatory for using the disclosed techniques. In alternative switch embodiments, a conventional buffer in which the queues have the same size can also be used.

Switch 32 further comprises a configurable switch fabric 56, which forwards packets between ingress ports 40A and egress ports 40B, via the respective queues, in accordance with a predefined routing plan. Typically, each packet belongs to a certain flow. By routing a certain flow to a certain port, fabric 56 causes the packets of that flow to be delivered over a certain routing path through network 30. Thus, each flow is typically assigned a certain routing path at any given time, and all the packets of the flow are routed by fabric 56 over that routing path. Switch 32 typically routes multiple flows simultaneously.

In the context of the present patent application and in the claims, the term "packet" is used to describe the basic data unit that is routed through the network. Different network types and communication protocols use different terms for such data units, e.g., packets, frames or cells. All of these data units are regarded herein as packets.

Switch 32 comprises a switch controller 60, which performs the various management tasks and some of the packet processing functions of switch 32. For example, switch controller configures fabric 56 to apply the desired routing plan. By controlling the routing plan, switch 32 is able to cause the packets to traverse various routing paths through network 30. In some embodiments, switch controller 60 re-routes a given flow in response to receiving a re-configuration request from network manager 38, e.g., when the flow in question is found to be congested by the switch, the network manager or both.

To re-route a given flow, switch controller 60 selects for the flow packets, which the switch receives via an ingress interface, a different egress interface. Switch 32 may, for example, save the current associations between ingress and egress interfaces in a Forwarding Database (FDB) (not shown in the figure). Alternatively, switch 32 can hold a set of routing rules, e.g., per flow.

Forwarding the packets is typically based on certain fields in the packet headers. The fields may include, for example, at least one of the source address, destination addresses, underlying protocol, source port number and destination port number. In some embodiments, forwarding the packets comprises calculating a hash function over one or more fields in the packet headers, and using the result hash value for selecting a respective egress interface for the packet.

Mirroring module 36 implements the decision-making and sampling parts of the port mirroring capabilities of the switch, and is comprised within switch controller 60. Mirroring module 36 identifies data flows that should be monitored based on various criteria, as will be described in detail below. The mirroring module samples packets from the identified data flows, and sends the sampled packets to the network manager via an egress port of the switch. The egress port used for mirroring may be used exclusively for sending mirrored packets, or can be used also for sending data flow packets.

Figure 3:
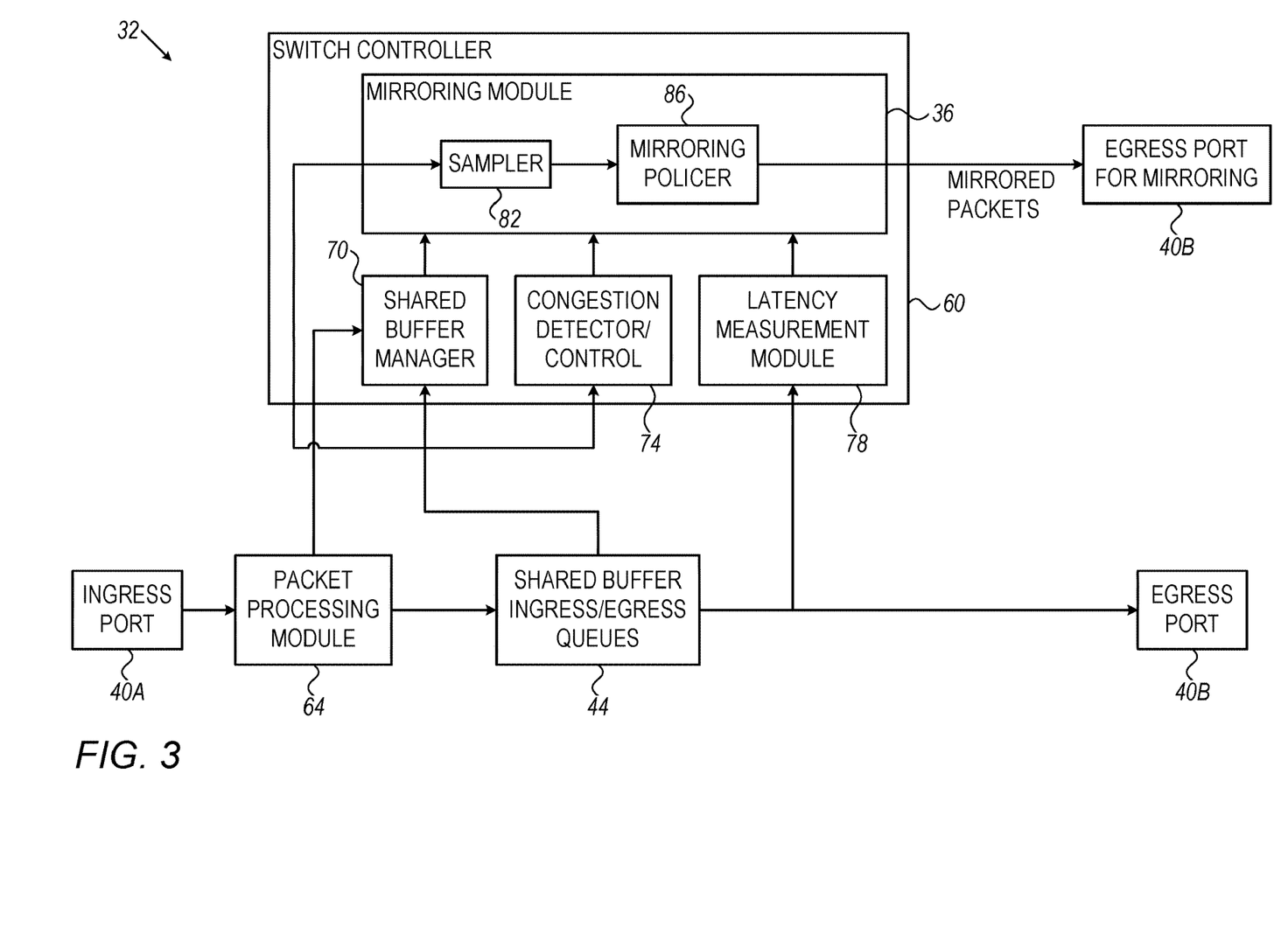
FIG. 3 is a block diagram that schematically illustrates a switch controller that manages packet mirroring, in accordance with an embodiment that is described herein.

FIG. 3 is a block diagram that schematically illustrates a switch controller (60) that manages packet mirroring, in accordance with an embodiment that is described herein.

In FIG. 3, switch controller 60 monitors data flows traversing switch 32. Packets arriving from the network via ingress interface 40A are processed by a packet processing module 64. The packet processing module applies to the packets various processing such as verifying the correctness of the data in the packet payload, packet classification and prioritization, and routing. The packet processing module typically checks certain fields in the packets headers for the purpose of packet classification and routing. The header fields contain addressing information, such as source and destination addresses and port numbers, and the underlying network protocol used.

Switch 32 typically temporarily stores packets for which there is no available egress queue or packets whose processing has not yet completed, in ingress queues 48 of shared buffer 44. Switch 32 stores packets whose routing has been resolved and awaiting transmission in egress queues 52 of the shared buffer.

For managing the mirroring, mirroring module 36 receives inputs from several modules that monitor the data flows traversing the switch, including a shared buffer manager 70, a congestion detector 74 and a latency measurement module 78. Congestion detector 74 is typically part of a module that performs congestion control methods and/or admission control methods. Congestion control is required for regulating traffic injection into the network. Admission control is required for regulating the number of users in the system for which the required quality of service can be satisfied.

Shared buffer manager 70 reports the level of buffer usage of shared buffer 44 to the mirroring module. The level of buffer usage can be measured for individual ingress and egress interfaces. In this case the buffer usage level specifies the amount of storage consumed by the data flows traversing the interface in question. Alternatively or additionally, the buffer usage level can be measured for a group of multiple aggregated ingress and/or egress interfaces. In this case, the buffer level usage specifies the amount of storage consumed by individual data flows traversing the interfaces in the group. Additionally, the shared buffer manager reports to the mirroring module queue length values measured for individual queues or to groups of queues in the shared buffer. A high level of buffer usage or a high valued queue length may be used to predict an imminent congestion condition or some other problem in the network. Similarly, an excessive queue length may indicate an imminent microburst.

In the example of FIG. 3 shared buffer manager 70 reports levels of buffer usage and queue length values to mirroring module 36. The mirroring module detects excessive buffer usage levels by comparing the reported buffer usage levels to respective predefined usage level thresholds. Similarly, the mirroring module detects excessive queue length values, by comparing the reported queue length values to respective predefined queue length thresholds.

Congestion detector 74 applies one or more congestion control methods. Congestion detector 74 may apply any suitable congestion control method such as Explicit Congestion Notification (ECN), Controlled Delay (CoDel), or detecting congestion using Phantom Queues (PQ). Alternatively or additionally, detector 74 may apply admission control methods such as Weighted Random Early Detection (WRED). The congestion detector reports to mirroring module 36 when detecting a congestion condition (or an impending congestion condition.) In some embodiments, congestion detector 74 reports to the mirroring module the identities of the congested data flows.

Latency measurement module 78 measures, for each packet individually, packet latency between pairs of ingress and egress interfaces. A long latency may indicate, for example, faults in queue arbitration, or heavily occupied queues that delay packet flow within the switch. Module 78 typically reports to the mirroring module statistical information on the packets latency. For example, in one embodiment, module 78 reports to the mirroring module minimum, maximum and/or average latency values between the ingress packets and respective egress packets. Alternatively or additionally, module 78 reports to the mirroring module histograms of the packets latencies.

Mirroring module 36 receives reports from shared buffer 70, congestion detector 74 and latency measurement module 78, and uses these reports to identify data flows for mirroring. In some embodiments, the mirroring module identifies for mirroring data flows for which the shared buffer manager reports excessive levels of buffer usage and excessive queue lengths. In other embodiments, the mirroring module identifies for mirroring data flows that are reported congested by congestion detector 74. In yet other embodiments, the mirroring module identifies for mirroring data flows in which a statistical property of the packet latencies, as reported by latency measurement module 78, exceeds a predefined latency threshold.

In the context of the present patent application and in the claims, the parameters that can be used for identifying data flows for mirroring are collectively referred to as a "buffering parameter."

Mirroring module 36 comprises a sampler 82 and a policer 88. Sampler 82 samples packets from the identified data flows according to a predefined sampling scheme. For example, in an embodiment, sampler 82 samples a given data flow by selecting one packet out of N consecutive packets of the data flow, wherein N is a configurable positive integer. Alternatively, sampler 82 can sample the given data flow periodically according to a predefined time period.

Choosing a given sampling rate determines a tradeoff between high visibility that is required for accurate analysis of the network state, and the usage of network resources for mirroring that could otherwise be unneeded, or used for data delivery or for other purposes.

Mirroring policer 86 receives the packets selected by sampler 82, and may discard one or more of these packets according to a predefined policy. Policer 86 sends each sampled packet that has not been discarded to the network manager via a mirroring port, which is an egress port different from the egress ports via which the packet is delivered to its intended destination.

Policer 86 may apply any suitable policy for discarding packets. In an example embodiment, policer 86 discards one or more of the sampled packets so as to limit the amount of traffic sent to the network manager. For example, policer 86 restricts the number of sampled packets (or the number of bytes from the sampled packets) delivered to the network manager in a predefined time window.

In some embodiments, mirroring module 36 sends to the network manager metadata in addition to the mirrored packets. For example, for one or more mirrored packets, the mirroring module sends respective mirroring-related metadata that indicates the severity level of the problem that has caused mirroring these packets. Example metadata include the measured level of buffer usage that caused mirroring, an indication of whether the mirrored packets were dropped by the congestion control or admission control mechanism and/or the actual packet latency that caused the mirroring.

The network and switch configurations shown in FIGS. 1, 2 and 3, are example configurations, which are chosen purely for the sake of conceptual clarity. In alternative embodiments, any other suitable network and/or switch configurations can be used. For example, although the embodiments described herein refer mainly to switches, the disclosed techniques can be implemented in various other types of network elements such as network routers.

Certain switch elements may be implemented using hardware/firmware, such as using one or more Application-Specific Integrated Circuits (ASICs) or Field-Programmable Gate Arrays (FPGAs). Alternatively, some switch elements may be implemented in software or using a combination of hardware/firmware and software elements.

In some embodiments, certain switch functions, such as certain functions of switch controller 60, may be implemented using a processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

As noted above, the switch comprises multiple interfaces 40 and other elements. In the description that follows and in the claims, the term "circuitry" refers to all the elements of the switch excluding the interfaces. In the example of FIGS. 2 and 3, the circuitry comprises packet processing module 64, shared buffer 44, switch fabric 56 and switch controller 60 of switch 32.

Selective Mirroring for Improving Quality of Service

Different applications that communicate over network 30 may require different levels of quality of service. In the context of the present patent application and in the claims, the term "quality of service" refers to the ability to guarantee a certain level of performance to a data flow. The level of performance can be defined in terms of a required bit rate, delay, jitter, packet loss, bit error rate and/or any other suitable performance parameter. For example, applications for real-time streaming of multimedia content such as voice over IP, online games and IPTV, typically require a fixed data rate and low delay.

In some of the disclosed embodiments, the switch identifies data flows for mirroring based on a buffering parameter that is indicative of levels of quality of service associated with the respective data flows. In these embodiments, the switch identifies a given data flow for mirroring by predicting, based on the buffering parameter, impending degradation in the quality of service associated with the given data flow.

Figure 4:
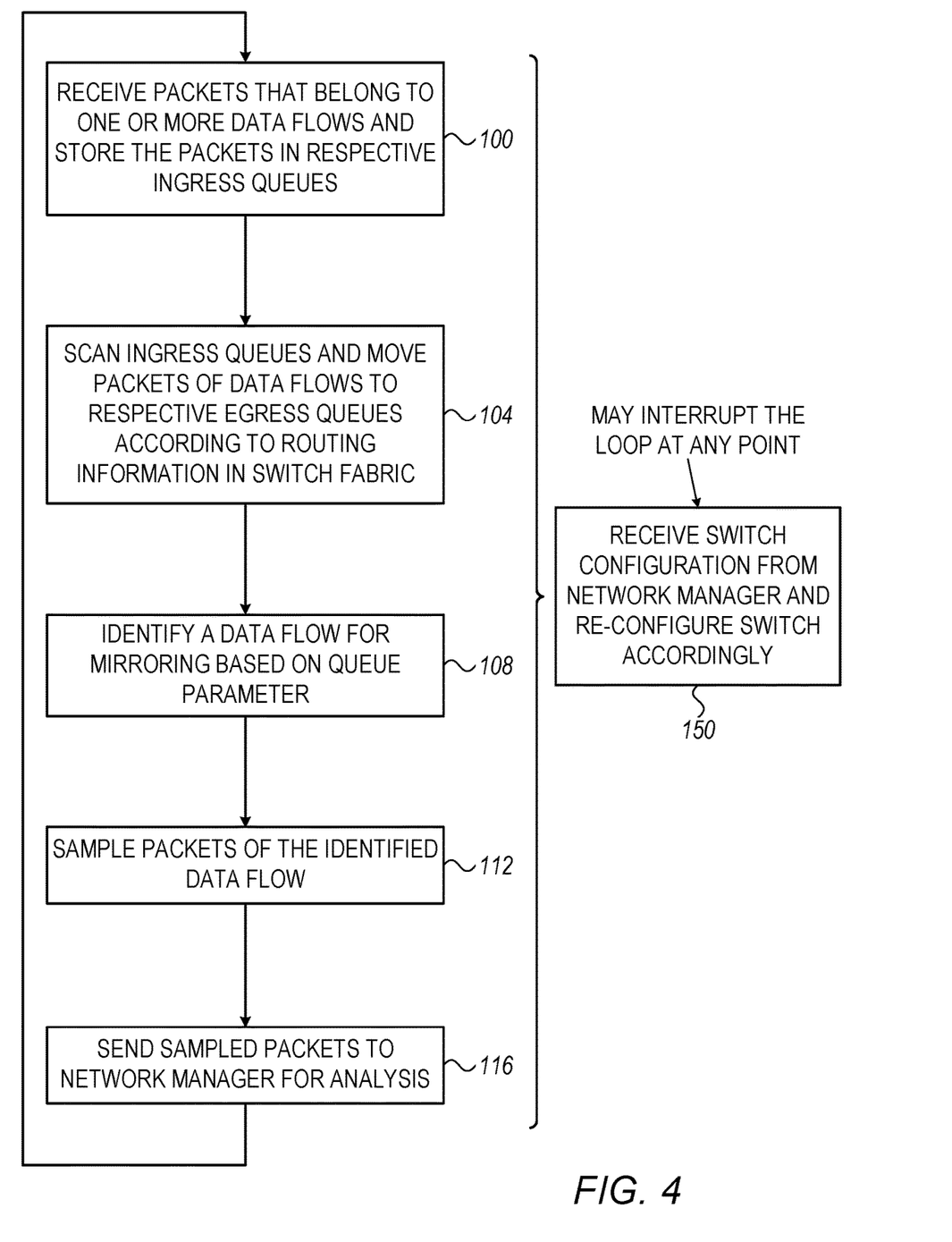
FIG. 4 is a flow chart that schematically illustrates a method for selective mirroring, in accordance with an embodiment that is described herein.

FIG. 4 is a flow chart that schematically illustrates a method for selective mirroring, in accordance with an embodiment that is described herein. The method is described as being executed by switch controller 60 of switch 32.

The method begins with switch controller 60 receiving via the switch ingress interfaces packets that belong to one or more data flows, at a reception step 100. The switch controller processes the received packets and stores the packets temporarily in ingress queues of shared buffer 44 corresponding to the respective data flows. In general, a given ingress queue may store packets that belong to one or more different data flows.

At a routing step 104, the switch controller scans the packets stored in the ingress queues, and resolves the routing for each packet using switch fabric 56. The switch controller moves packets whose routing has been resolved to egress queues of the shared buffer. Moving the packets may be delayed when the egress queues have no free space.

At a flow identification step 108, the switch controller monitors a respective buffering parameter of the data flows received via the ingress interfaces and queued while awaiting transmission via respective egress interfaces. The switch controller identifies a data flow for mirroring based on the buffering parameter. The following list includes some example buffering parameters:

Buffer usage levels measured for the ingress interfaces and egress interfaces. The decision to mirror packets of a given data flow is based on the respective buffer usage levels of the ingress interfaces, egress interfaces or both. For example, when network 30 comprises a lossless or a lossy network, the decision can be based on the buffer usage levels of the ingress interfaces, or of the egress interfaces, respectively.

Queue length—measured for the ingress queues and the egress queues of the shared buffer.

Congestion state—packets of data flows that the switch detects to be congested or that are close to be congested should be mirrored.

Packet latency—packets of data flows that are delayed for long periods within the switch should be mirrored.

In the present example, the buffering parameter is indicative of levels of quality of service associated with the data flows, as described above.

At a sampling step 112, the switch controller selects one or more packets of the data flow identified at step 108. For example, sampler 82 of the switch controller selects one packet every N consecutive packets of the identified data flow. Note that before identifying a given data flow for mirroring, no packets of the given data flow are mirrored. The identification of a data flow for mirroring enables the actual mirroring of the data flow packets.

At a sending mirroring information step 116, the switch controller sends the sampled packets over the network via an egress port that is configured to send the packets to the network manager. In some embodiments, one or more of the sampled packets are discarded and not delivered to the network manager, based on a suitable policy, as described above. Following step 116 the method loops back to step 100 to receive subsequent packets.

At a re-configuration step 150, the switch receives a switch configuration from the network manager. This may occur, for example, as a result of the network manager analyzing the mirroring information set by the switch (and other switches in the network) and re-configuring the switch to improve the network performance. In response to receiving the switch configuration, switch 32 re-configures its settings, accordingly, and the loop of the method then continues.

The embodiments described above are given by way of example, and alternative suitable embodiments can also be used. For example, although in the disclosed embodiments data flows are processed individually, in alternative embodiments, multiple links that belong to a common Link Aggregation Group (LAG) can be identified for mirroring as if they comprise a single data flow.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network element, comprising:
multiple interfaces, including one or more ingress interfaces and one or more egress interfaces, which are configured to connect to a communication system; and
circuitry, which is configured to:
receive from the communication system, via the one or more ingress interfaces of the network element, packets belonging to one or more data flows, and buffer the received packets in one or more queues of the network element, wherein the buffered packets are awaiting transmission to the communication system via respective egress interfaces of the network element;
forward each of the received packets to at least one of the one or more egress interfaces based on at least one header field of the packet;
examine the packets buffered in the one or more queues of the network element, to identify a data flow that is predicted to experience degradation in a level of quality of service associated with the identified data flow;
select from the one or more queues, one or more packets of the identified data flow, which was predicted to experience the degradation, for analysis by a network manager that is coupled to the communication system; and
send copies of the selected packets to the network manager over the communication system via an egress interface of the network element, in addition to forwarding the packets based on the at least one header field,
wherein the circuitry is configured to monitor a buffering parameter that is indicative of levels of quality of service associated with the respective received data flows, and to identify a given data flow for mirroring, by predicting, based on the buffering parameter, impending degradation in the level of quality of service associated with the given data flow.

2. The network element according to claim 1, wherein the circuitry is configured to identify a given data flow for mirroring before the circuitry detects a condition that causes the circuitry to discard one or more packets of the given data flow.

3. The network element according to claim 1, wherein the circuitry is configured to monitor a level of buffer usage by an interface of the network element, and to identify for mirroring the data flows delivered via a given interface, in response to detecting that an actual level of buffer usage by the given interface exceeds a predefined usage threshold.

4. The network element according to claim 1, wherein the circuitry is configured to monitor a queue length value, and to identify for mirroring the data flows stored in a given queue, in response to detecting that an actual queue length value of the given queue exceeds a predefined queue length threshold.

5. The network element according to claim 1, wherein the circuitry is configured to monitor a packet latency value, to derive a result value from multiple packet latencies of respective packets belonging to at least one data flow, and to identify a given data flow for mirroring, in response to detecting that the result value derived from the packets of the given data flow exceeds a predefined latency threshold.

6. The network element according to claim 1, wherein the circuitry is configured to monitor a congestion state, and to identify a given data flow for mirroring, in response to determining that the given data flow is congested.

7. The network element according to claim 1, wherein the circuitry is configured to select the one or more packets of the identified data flow by sampling the packets of the identified data flow at a predefined sampling rate.

8. The network element according to claim 1, wherein the circuitry is configured to send the copies of the selected packets of the identified data flow to the network manager along with respective mirroring-related metadata.

9. The network element according to claim 8, wherein the mirroring-related metadata sent with the selected packets comprises an indication of a severity level of a problem that caused the selection of the packets.

10. The network element according to claim 1, wherein the circuitry is configured to select the packets sent to the network manager, in addition to forwarding the packets based on the at least one header field, by a sampler which selects packets of the identified data flow and a policer which discards some of the selected packets, so that only copies of selected packets not discarded are forwarded to the network manager.

11. The network element according to claim 10, wherein the policer is configured to discard some of the selected packets so as to restrict a number of sampled packets delivered to the network manager in a predefined time window.

12. The network element according to claim 10, wherein the policer is configured to discard some of the selected packets so as to restrict a number of bytes delivered to the network manager in a predefined time window.

13. A method, comprising:
in a network element, receiving from a communication system, via one or more ingress interfaces of the network element, packets belonging to one or more data flows, and buffering the received packets in one or more queues of the network element, wherein the buffered packets are awaiting transmission to the communication system via respective egress interfaces of the network element;
forwarding each of the received packets to at least one egress interface of the network element, based on at least one header field of the packet;
examining the packets buffered in the one or more queues of the network element, to identify a data flow that is predicted to experience degradation in a level of quality of service associated with the identified data flow;
selecting from the one or more queues, one or more packets of the identified data flow, which was predicted to experience the degradation, for analysis by a network manager that is coupled to the communication system; and sending copies of the selected packets to the network manager over the communication system via an egress interface of the network element, in addition to forwarding the packets based on the at least one header field, wherein examining the packets buffered in the one or more queues comprises monitoring a buffering parameter that is indicative of levels of quality of service associated with the respective received data flows, and wherein the method further comprises identifying a given data flow for mirroring by predicting, based on the buffering parameter, impending degradation in the level of quality of service associated with the given data flow.

14. The method according to claim 13, wherein and comprising identifying a given data flow for mirroring before detecting a condition that causes the network element to discard one or more packets of the given data flow.

15. The method according to claim 13, wherein examining the packets buffered in the one or more queues comprises monitoring a level of buffer usage by an interface of the network element, and comprising identifying for mirroring the data flows delivered via a given interface, in response to detecting that an actual level of buffer usage by the given interface exceeds a predefined usage threshold.

16. The method according to claim 13, wherein examining the packets buffered in the one or more queues comprises monitoring a queue length value, and comprising identifying for mirroring the data flows stored in a given queue, in response to detecting that an actual queue length value of the given queue exceeds a predefined queue length threshold.

17. The method according to claim 13, wherein examining the packets buffered in the one or more queues comprises monitoring a packet latency value, and comprising deriving a result value from multiple packet latencies of respective packets belonging to the at least one data flow, and identifying a given data flow for mirroring, in response to detecting that the result value derived from the packets of the given data flow exceeds a predefined latency threshold.

18. The method according to claim 13, wherein examining the packets buffered in the one or more queues comprises monitoring a congestion state, and comprising identifying a given data flow for mirroring, in response to determining that the given data flow is congested.

19. The method according to claim 13, wherein selecting the one or more packets of the identified data flow comprises sampling the packets of the identified data flow at a predefined sampling rate.

20. The method according to claim 13, wherein sending the selected packets comprises sending the selected packets of the identified data flow along with respective mirroring-related metadata.

21. The method according to claim 13, further comprising receiving in the network element switch configuration instructions from the network manager and re-configuring the network element responsive to the switch configuration instructions.

22. The method according to claim 13, further comprising re-configuring a network by the network manager responsive to the selected packets sent to the network manager.

* * * * *